US010990307B2

(12) United States Patent
Yang et al.

(10) Patent No.: US 10,990,307 B2
(45) Date of Patent: Apr. 27, 2021

(54) SYSTEM AND METHOD FOR PROVIDING A CONFIGURABLE STORAGE MEDIA INTERFACE

(71) Applicant: BROADCOM INTERNATIONAL PTE. LTD., Singapore (SG)

(72) Inventors: Shaohua Yang, San Jose, CA (US); John Jansen, Macungie, PA (US)

(73) Assignee: BROADCOM INTERNATIONAL PTE. LTD., Singapore (SG)

(*) Notice: Subject to any disclaimer, the term of this patent is extended or adjusted under 35 U.S.C. 154(b) by 185 days.

(21) Appl. No.: 16/047,062

(22) Filed: Jul. 27, 2018

(65) Prior Publication Data

US 2020/0034060 A1 Jan. 30, 2020

(51) Int. Cl.
*G06F 3/06* (2006.01)
*G06F 13/16* (2006.01)
*G06F 13/42* (2006.01)

(52) U.S. Cl.
CPC .......... *G06F 3/0634* (2013.01); *G06F 3/0604* (2013.01); *G06F 3/0656* (2013.01); *G06F 3/0679* (2013.01); *G06F 13/1668* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 8,127,059 B1 * | 2/2012 | Carr | G06F 13/387 710/74 |
| 8,677,203 B1 | 3/2014 | Shalvi et al. | |
| 2005/0149656 A1 * | 7/2005 | Seto | G06F 13/405 710/105 |
| 2007/0070887 A1 * | 3/2007 | Lee | G06F 11/2007 370/228 |
| 2010/0268985 A1 * | 10/2010 | Larsen | G11C 29/10 714/6.12 |
| 2012/0137166 A1 * | 5/2012 | Kurihara | G06F 11/2005 714/5.1 |
| 2012/0144082 A1 * | 6/2012 | Romero | G06F 3/061 710/300 |
| 2012/0226854 A1 | 9/2012 | Williams et al. | |
| 2016/0011780 A1 * | 1/2016 | Washiya | G06F 3/0613 710/5 |
| 2019/0187929 A1 * | 6/2019 | Srivastava | G06F 3/0659 |
| 2019/0189226 A1 * | 6/2019 | Srivastava | G11C 29/50012 |

* cited by examiner

*Primary Examiner* — Charles Rones
*Assistant Examiner* — Ryan Dare
(74) *Attorney, Agent, or Firm* — Morgan, Lewis & Bockius LLP

(57) ABSTRACT

A semiconductor device, memory system, and method are provided. One example of the semiconductor device is disclosed to include a host interface that enables bi-directional communications with a host computer, a processor subsystem that enables processing of read or write requests received at the host interface, and one or more storage media interfaces, each of the one or more storage media interfaces being convertible between a first configuration and a second configuration, where the first configuration of a storage media interface enables a direct connection with a computer memory device, and where the second configuration of the storage media interface enables a connection with a plurality of computer memory devices via an expander and/or re-timer.

20 Claims, 8 Drawing Sheets

SYSTEM AND METHOD FOR PROVIDING A CONFIGURABLE STORAGE MEDIA INTERFACE

FIELD OF THE DISCLOSURE

The present disclosure is generally directed toward communication systems and memory system and, more specifically, toward controllers for memory systems.

BACKGROUND

For certain controllers, such as Solid-State Drive (SSD) controllers, there is a need to connect many NAND memory chips to a controller to enable high-capacity applications. Ever increasing host throughput requires an increased number of NAND Input/Outputs (I/Os). Problematically, this desire to accommodate more NAND I/Os conflicts with the desire to decrease the overall size of such controllers.

BRIEF DESCRIPTION OF THE DRAWINGS

The present disclosure is described in conjunction with the appended figures, which are not necessarily drawn to scale.

DETAILED DESCRIPTION

Figure 1:
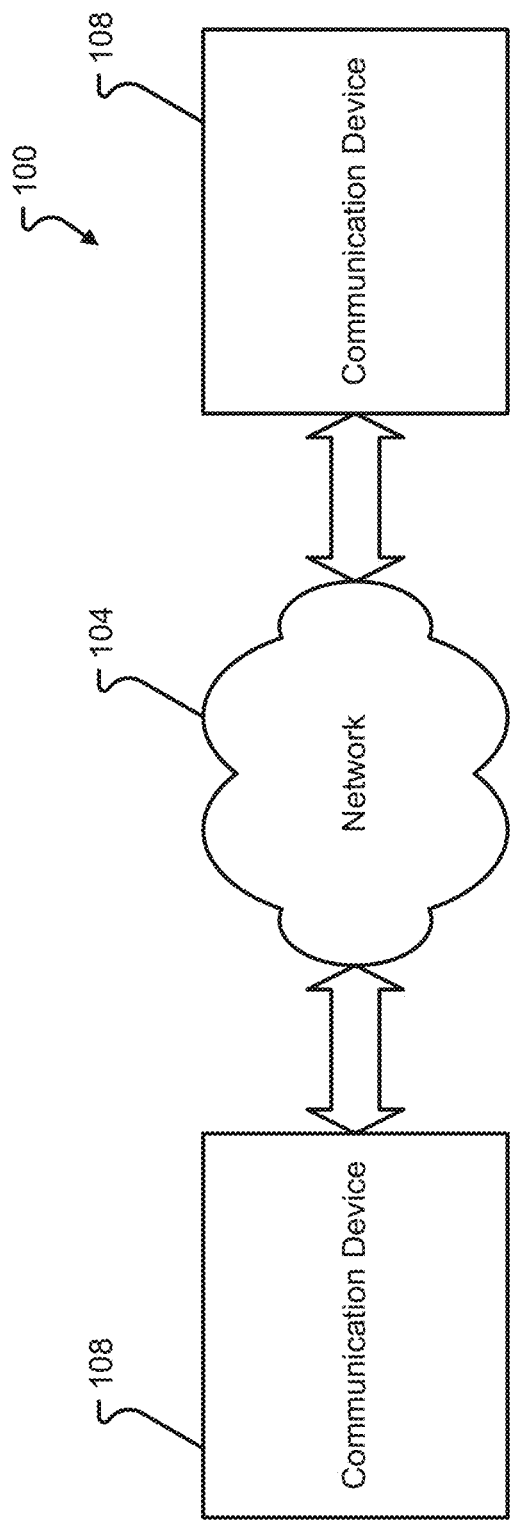
FIG. 1 is a block diagram depicting a data transmission system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any location within a distributed network of components without impacting the operation of the system.

Furthermore, it should be appreciated that the various links connecting the elements can be wired, traces, or wireless links, or any combination thereof, or any other known or later developed element(s) that is capable of supplying and/or communicating data to and from the connected elements. Transmission media used as links, for example, can be any suitable carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any type of methodology, process, mathematical operation or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-9, various systems, devices, and method of controlling a memory system will be described in accordance with at least some embodiments of the present disclosure.

In accordance with at least some embodiments, a multi-character or configurable storage media interface is provided that facilitates direct connectivity with memory devices, such as NAND devices, as well as connectivity with memory devices through an expander and/or a re-timer. A controller for a memory system is also disclosed to include one or multiple storage media interfaces. One, some, or all of the storage media interfaces of the controller may be configurable as described herein. In some embodiments, a storage media interface is configurable between a first configuration and a second configuration. In the first configuration, the storage media interface may enable direct connectivity with a computer memory device according to a first memory media interface signaling specification (e.g., a standardized media interface signaling specification such as ONFI v4.1) whereas in the second configuration the storage media interface may enable a second type of connection (e.g., a higher data rate or more power efficient connection similar as DDR4x) to computer memory devices via an expander and/or re-timer using a signaling scheme that is non-trivially different from the first memory media interface signaling specification. In some embodiments, the second type of connection or different signaling scheme may be optimized for point-to-point connectivity with a lighter load than the first type of connection to computer memory devices. In some embodiments, the second type of connection or different signaling scheme may be using a lower voltage and use a different driver and termination method than the first type of connection. In some embodiments, an expander can be used to further connect multiple memory devices and expand the overall memory capacity and performance, while a re-timer may be used to latch and reshape the storage media interface signal for maintaining high signal integrity. The first configuration may facilitate small capacity memory applications whereas the second configuration may facilitate higher performance applications and can further expand the number of computer memory devices or extend the wire length that are connected to the storage media interface (e.g., via the expander and/or re-timer). In this way, a controller having one or more storage media interfaces as disclosed herein can provide a dual-purpose interface (e.g., a direct media device interface and a point to point interface connecting to the expander and/or re-timer).

Advantageously, the proposed controller and its storage media interfaces may provide a controller whose design is monolithic, but the controller can be used for multiple different purposes. This effectively reduces development and/or manufacturing costs associated with producing the controller for different applications. Further still, since all memory applications may use the same hardware and/or firmware, the reliability of the controller in different usages can be improved.

With reference now to FIG. 1, additional details of a data transmission system 100 will be described in accordance with at least some embodiments of the present disclosure. The data transmission system 100 is shown to include two communication devices 108, each of which are connected with a communication network 104. The communication devices 108 may be considered to be communicatively coupled with one another via the communication network 104. Although the communication devices 108 may be provided as any type of machine or collection of components, some non-limiting examples of a communication device 108 include a mobile phone, a smart phone, a Personal Computer (PC), a laptop, a telephone, a tablet, a server, a switch, or data storage device, etc. It should be appreciated that one or both communication devices 108 may be user devices (e.g., devices that are carried and utilized by a user) having a user interface. Alternatively, one or both communication devices 108 may be servers, switches, or other types of machines that are devoid of a robust user interface. Said another way, the communication devices 108 may correspond to any type of machine capable of communicating with another machine via the communication network 104.

The communication network 104 may correspond to any type of communication bus, collection of communication devices, combinations thereof, or the like. As an example, the communication network 104 may correspond to a packet-based communication network. Even more specifically, the communication network 104 may correspond to an IP-based communication network and may use communication protocols such as the Ethernet protocol. It should be appreciated that the communication network 104 does not necessarily need to be limited to an Ethernet-based communication network, but rather any interconnected collection of computing devices using any type of communication protocol or combination of communication protocols may qualify as the communication network 104. The communication network 104 may utilize wired and/or wireless communication protocols.

In some embodiments, the data transmission system 100 may correspond to a memory system in which one of the communication devices 108 is a host device connected with another communication device 108 which may be configured as a memory controller or the like. In particular, the host device may be configured to send I/O commands to the memory controller via a communication network 104 and the memory controller may respond to such I/O commands in turn. Although not depicted in FIG. 1, the memory controller may be further connected to a memory system that includes one or multiple computer memory devices that are connected via a storage backend.

Figure 2:
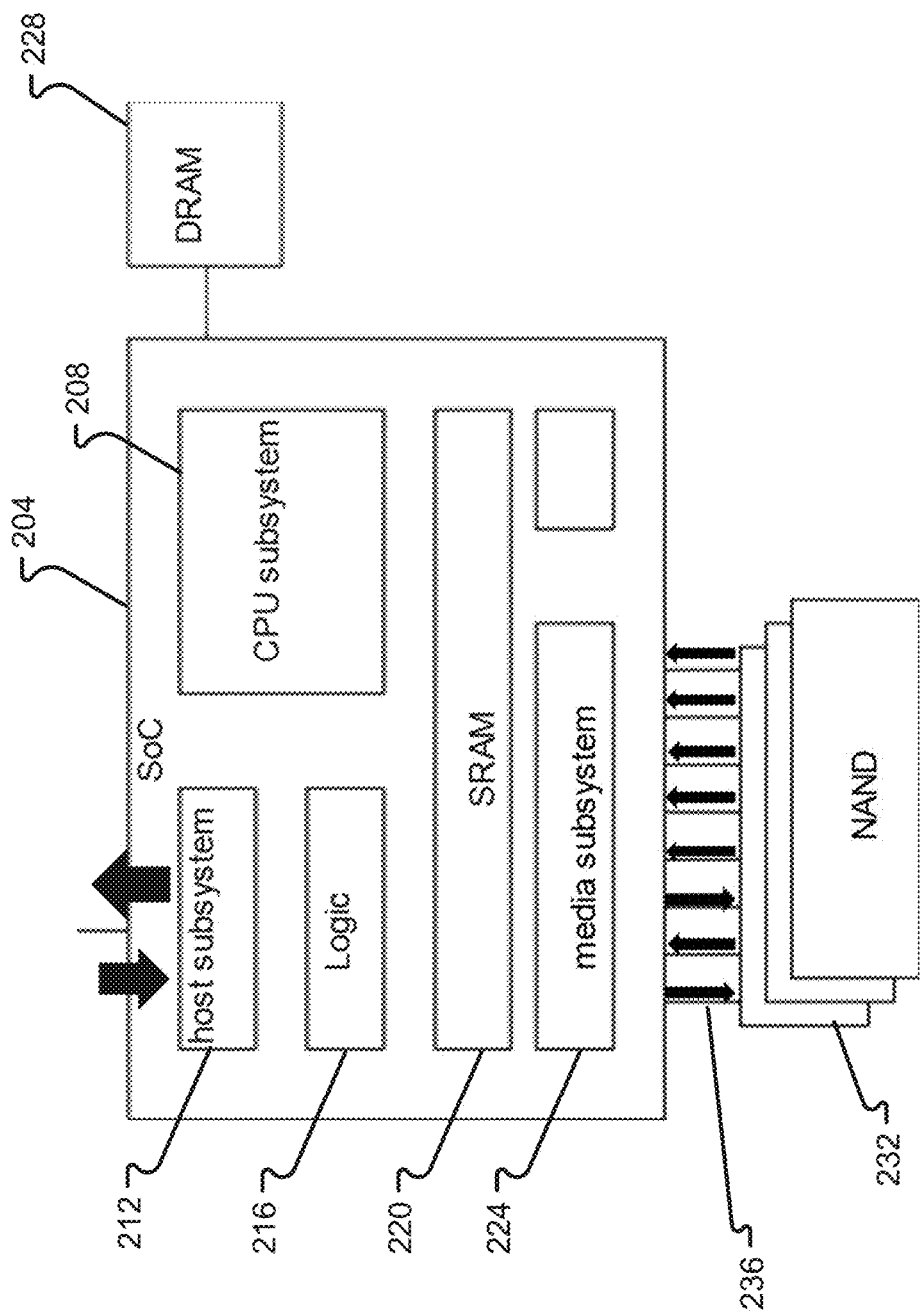
FIG. 2 is a block diagram depicting a memory system in accordance with at least some embodiments of the present disclosure.

With reference now to FIG. 2, additional details of a controller for a memory system will be described in accordance with at least some embodiments of the present disclosure. The controller 204 is shown as being a system-on-chip (SoC) or similar type of semiconductor device. In some embodiments, the controller 204 includes a number of components that enable the controller 204 to execute data storage routines in accordance with I/O commands received from a host device, such as a communication device 108.

The controller 204 is shown to include a CPU subsystem 208, a host subsystem 212, controller logic 216, internal memory 220, and a media subsystem 224. The controller 204 may further have access to external processing memory 228, in the form of Dynamic Random Access Memory (DRAM) in some embodiments. As will be discussed in further detail herein, the controller 204 may be connectable to a plurality of computer memory devices 232, which, in some embodiments, are provided as NAND memory devices. The connectivity with the memory devices 232 may be provided through one or more storage media interfaces 236.

In some embodiments, the CPU subsystem 208 includes a processor or a plurality of processors that enable operation of the controller 204. More specifically, the CPU subsystem 208 may implement the logic 216 of the controller 204. The logic 216 may be provided as one or more instructions (e.g., firmware, software, logic gates, etc.) and the CPU subsystem 208 may be responsible for processing one or more I/O commands that are received from a host at the host subsystem 212. The host subsystem 212 may further be configured to enable bi-directional communications with a host computer. The CPU subsystem 208 may process the I/O commands, which may be provided as read and/or write commands, that are received at the host subsystem 212. Thus, the host subsystem 212 may be considered a host interface or similar type of device that enables the controller 204 to communicate with a host device.

The data link with the host subsystem 212 may be in the form of a Peripheral Computer Interconnect express (PCIe) data link. In some embodiments, the data link with the host subsystem 212 is provided as a 16-wire, duplex, 3.2 GBps, 6.4 GBps, or 12.8 GBps data link. The CPU subsystem 208 along with the logic 216, SRAM 220, and media subsystem 224 may enable connectivity with the computer memory devices 232 through one or memory data interfaces 236. The memory data interfaces 236 may be provided as an ONFI v4.1 data interface which may be one or more of an 8-bity parallel data interface, a unidirectional data interface, a 666 MT/s data interface, an 800 MT/s data interface, or a 1.2 GT/s data interface.

The SRAM 220 may correspond to any type of internal memory device that can be provided in a semiconductor device along with the other components of the controller 204. As an example, the SRAM 220 may correspond to an internal semiconductor memory device used by the controller 204 to temporarily store data in connection with executing an I/O command received at the host subsystem 212.

The media subsystem 224 may include logic that is executable by the CPU subsystem 208 to facilitate data transfers with the computer memory devices 232. In some embodiments, the media subsystem 224 enables the controller 204 to connect with the computer memory devices 232 in either a first configuration or a second configuration. In some embodiments, the first configuration enabled by the media subsystem 224 facilitates a direct connection with the computer memory devices 232 whereas the second configuration enabled by the media subsystem 224 facilitates a connection with computer memory devices 232 through an expander and/or re-timer.

The DRAM 228 may correspond to one or more external memory devices that enhance or enable functionality of the controller 204. In some embodiments, the DRAM 228 comprises any type of known memory device that can be accessed by the CPU subsystem 208 in connection with performing its functions. Thus, data may temporarily be stored to the DRAM 228 by the CPU subsystem 208 while performing a read and/or write command based on an I/O command received from a host device.

Figure 3:
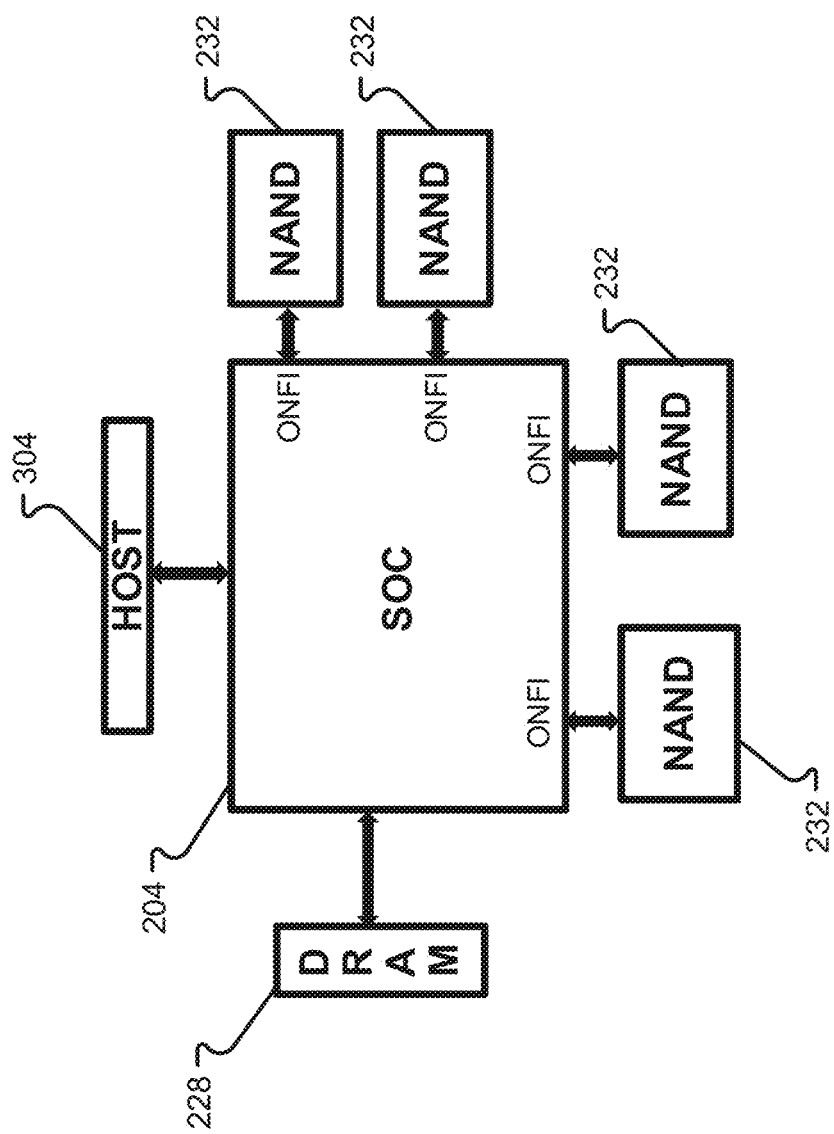
FIG. 3 is a block diagram depicting a controller in a first configuration in accordance with at least some embodiments of the present disclosure.
Figure 4:
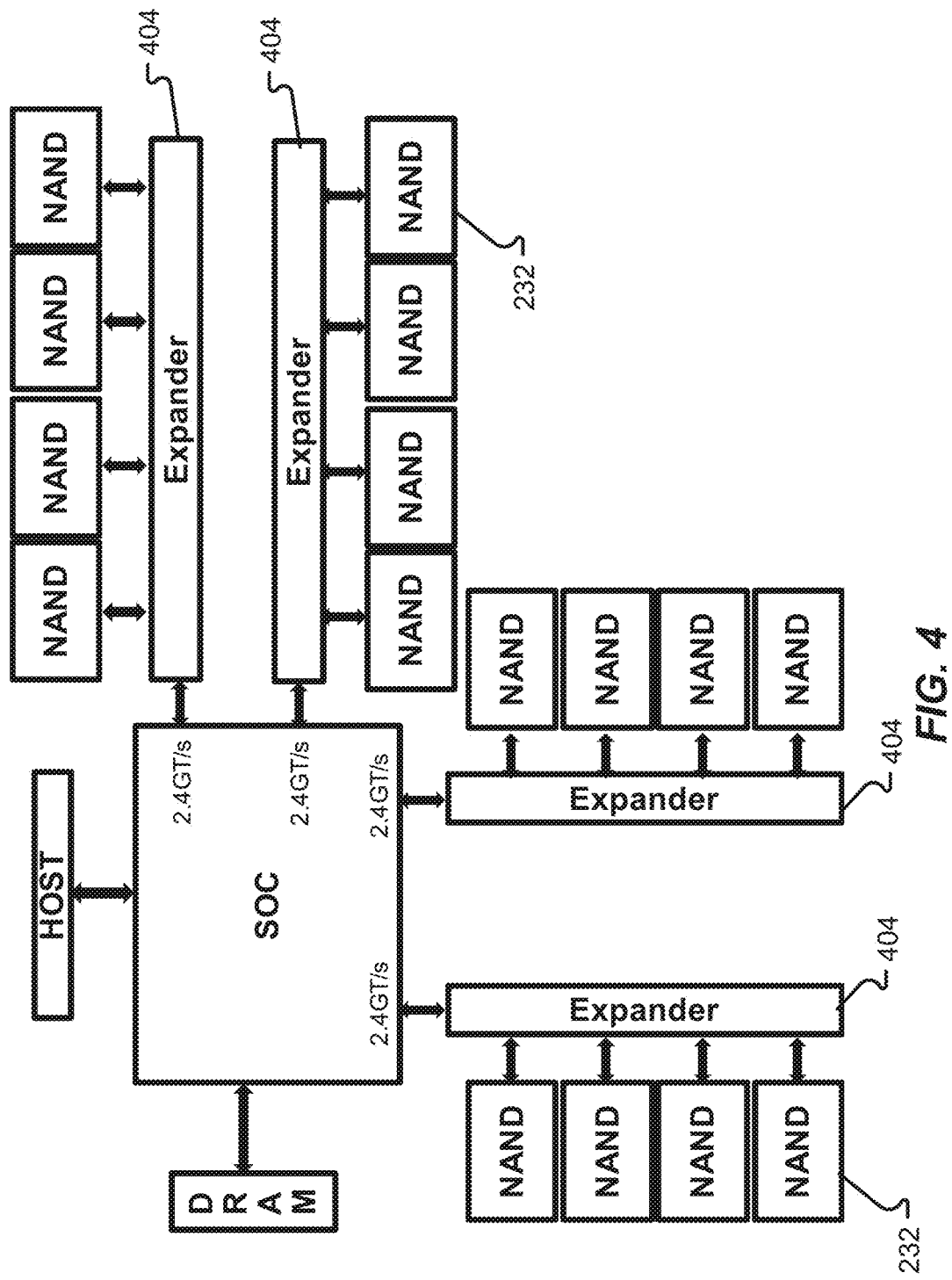
FIG. 4 is a block diagram depicting a controller in a second configuration in accordance with at least some embodiments of the present disclosure.

With reference now to FIGS. 3 and 4, additional details of a controller 204 and its various possible configurations will be described in accordance with at least some embodiments of the present disclosure. The controller 204, as shown in FIG. 3, may be provided in a first configuration where the controller 204 is directly connected with one or more computer memory devices 232. More specifically, the controller 204 may have some or all of its storage media interfaces provided in a first configuration that facilitates a direct connection with computer memory devices 232. In this particular configuration, the controller 204 may be configured to receive an I/O command from a host device 304 and execute the I/O command on one or multiple of the computer memory devices 232 via the storage media interfaces. In the depicted embodiment, each computer memory device 232 is directly connected to the controller 204 via the storage media interfaces, which are shown to be in an ONFI v4.1 configuration. In this configuration, the controller 204 may include approximately 12 storage media interface ports. The throughput of those ports may be anywhere between 8.0 and 14.4 GBps whereas the throughput of the host subsystem 212 is approximately 16 GBps (e.g., if configured as a PCIe G5 x4 port). In this particular configuration, the controller 204 connects directly with the computer memory devices 232 and there is a 1:1 ratio of computer memory devices to storage media interfaces. Each memory device 232 could include multiple memory dies that are enabled and selected by the storage media interface signals according to standardized first signaling protocol (e.g., a standardized signaling protocol such as ONFI v4.1). Again, the controller 204 may have access to the external memory 228 to enable processing the I/O commands received from the host device 304.

FIG. 4, on the other hand, shows the controller 204 in a second configuration where the one or more storage media interfaces connect with computer memory devices 232 via an expander and/or re-timer 404. Although embodiments of the present disclosure will be described with reference to an expander/re-timer 404, it should be appreciated that an expander having capabilities of the expander/re-timer 404 depicted and described herein can be considered an "expander" as discussed herein. Said another way, the expander/re-timer 404 may be referred to simply as an expander, an expander component, an expander element, or the like. Such an "expander" may exhibit expander and/or re-timer capabilities without departing from the scope of the present disclosure.

In the configuration depicted in FIG. 4, the storage media interfaces no longer utilize the ONFI v4.1 configuration, but rather operate as a point-to-point connection in a low power signaling mechanism and/or at a higher data rate, e.g. approximately 2.4 GT/s. This enables connectivity with the expanders and/or re-timers 404 at approximately 2.4 GT/s. If the controller 204 includes approximately 12 media ports, the aggregated throughput of all storage media interface may be as much as 12*2.4G=28.8 GBps, while the throughput of the host subsystem 212 is still approximately 16 GBps. Thus, connectivity speeds of the host subsystem 212 can be accommodated in either the first configuration or second configuration of the controller 204 and its storage media interfaces for different applications.

In this particular configuration, the expander and/or re-timer 404 connects a single storage media interface of the controller 204 with one or a plurality of computer memory devices 232. The interface between the expander and/or re-timer 404 and controller 204 may be operating at approximately 2.4 GT/s. The media throughput of 2.4 GT/s per lane supports a throughput for multiple computer memory devices 232 anywhere between 666 MT/S, 800 MT/S, and 1.2 MT/s in parallel.

Figure 5:
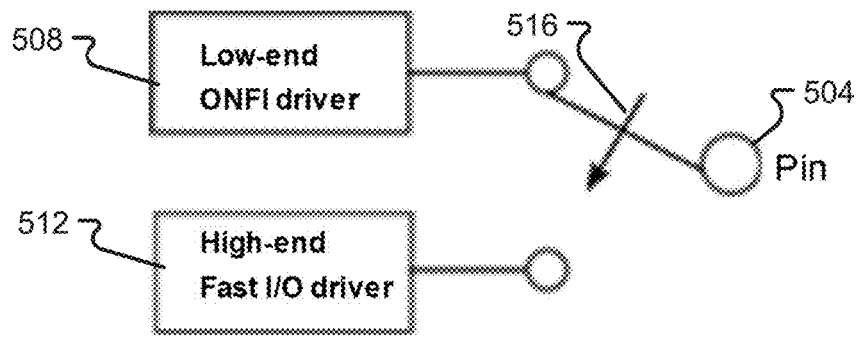
FIG. 5 is a block diagram depicting details of a storage media interface in accordance with at least some embodiments of the present disclosure.

With reference now to FIG. 5, additional details of the storage media interfaces and their possible configurations will be described in accordance with at least some embodiments of the present disclosure. Each storage media interface of a controller 204 may be configurable as shown in FIG. 5, although not every storage media interface needs to possess the capabilities of a storage media interface as depicted and described herein.

FIG. 5 shows that each storage media interface may include a first driver 508 and second driver 512 along with an I/O pin 504 that facilitates a physical connection with external devices, such as a computer memory device 232 or expander and/or re-timer 404. The physical pin 504 can connect with either the first driver 508 or second driver 512 via a configurable switch 516. The configurable switch 516 may correspond to a physical or logical switch that is actuated in silicon. In some embodiments, the switch 516 is movable between a first and second position. When the switch 516 is placed in the first position, the controller 204 may be considered to be in a first configuration and the storage media interface may be directly connectable to a computer memory device 232. In the first position, the pin 504 is connect with the first driver 508, which is shown to correspond to a low-end driver that operates the standardized memory device (e.g., ONFI) I/O at 666 MT/s, 800 MT/s, or 1.2 GT/s. In this position, the first driver 508 operates the storage media interface whereas the second driver 512 remains idle and does not operate the storage media interface.

When the switch 516 is in the second position, the controller 204 may be considered to be in a second configuration and the storage media interface may be connectable with an expander and/or re-timer 404 and one or multiple computer memory devices 232. In this configuration, the pin 504 may be used to carry high throughput data operations of up to 2.4 GT/s and the parallel interface may connect the controller 204 to the expander and/or re-timer 404. Moreover, the second driver 512 can be used to operate the storage media interface when the switch 516 is in the second position. In this position, the second driver 512 operates the storage media interface whereas the first driver 508 remains idle and does not operate the storage media interface.

In some embodiments, the switch 516 enables the controller 204 to assume one of two different configurations. As a non-limiting example, the two configurations may utilize different electrical signaling over the pin 504. In the first configuration (e.g., when the switch 516 is in the first position), the controller 204 could use 1.2V or 1.8V electrical signaling. In the second configuration (e.g., when the switch 516 is in the second position), the controller 204 could use both 1.2V and 0.6V to further reduce voltage and save power. In some embodiments, the first configuration could be used to drive light loads (e.g., single-die memory devices or an expander/re-timer) and heave load (e.g., 16-die memory device) with different termination configurations. Even in the light load mode of operation, the power would not be as low as the second configuration or run as fast as the second configuration. The second configuration could be designed/optimized for point-to-point connectivity and, thus, does not need to be compatible with memory devices, thereby making the second configuration more power and/or data rate efficient.

Moreover, the two different configurations could be switched logically over a single circuit instead of having two physical circuit modules for the two configurations. According to some embodiments, the logic switch implementation may configure the I/O pin 514 so that it behaves according to the set configuration accordingly.

Figure 6:
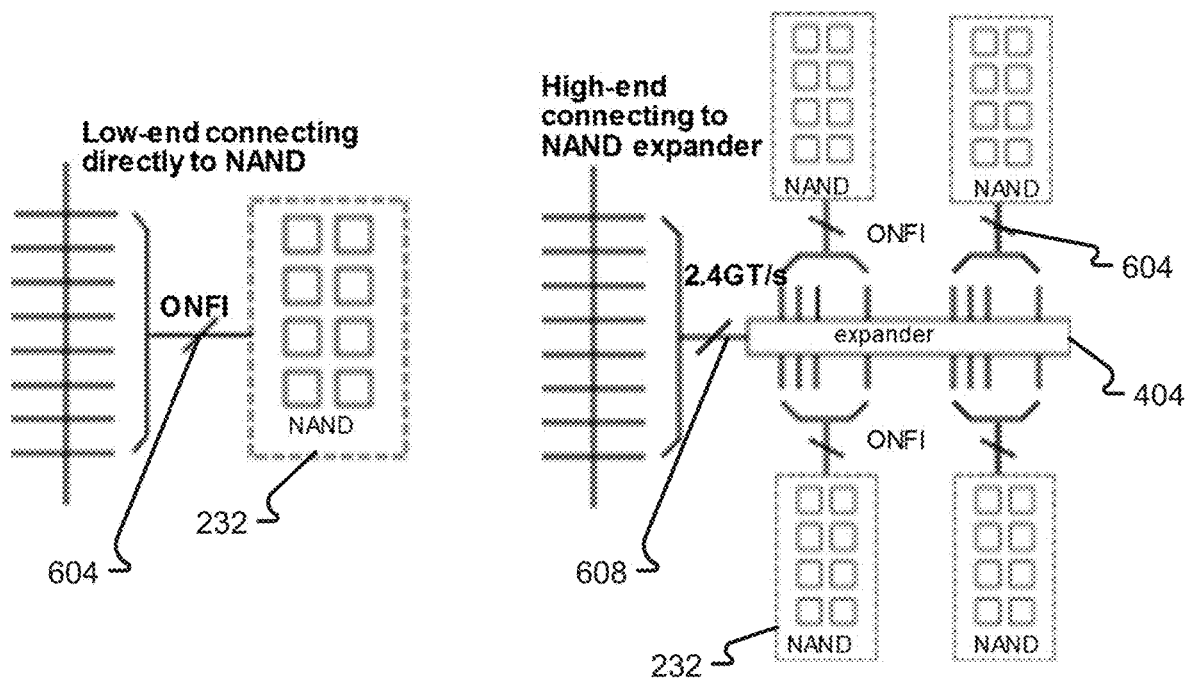
FIG. 6 is a block diagram depicting a storage media interface in various configurations in accordance with at least some embodiments of the present disclosure.

FIG. 6 shows the connectivity of the storage media interface when the switch 516 is in both the first position and second position. When the switch 516 is in the first position, the storage media interface connects directly with a computer memory device 232 using an ONFI v4.1 I/O configuration 604. When the switch 516 is in the second position, the storage media interface connects with the expander/re-timer 404 using a higher throughput connection 608 with the expander/re-timer 404. In some embodiments, up to 10 inches of wire can be used between the controller 204 and expander/re-timer 404 in the second configuration. The expander/re-timer 404 enables connectivity with more than one computer memory device 232 per storage media interface and such connectivity facilitates a higher aggregated throughput using the expanders/re-timers 404. The expander/re-timer 404, as will be described in further detail herein, may have an ONFI v4.1 I/O configuration 604 with each of the computer memory devices 232 even though it has the higher throughput connection 608 with the controller 204.

Figure 7:
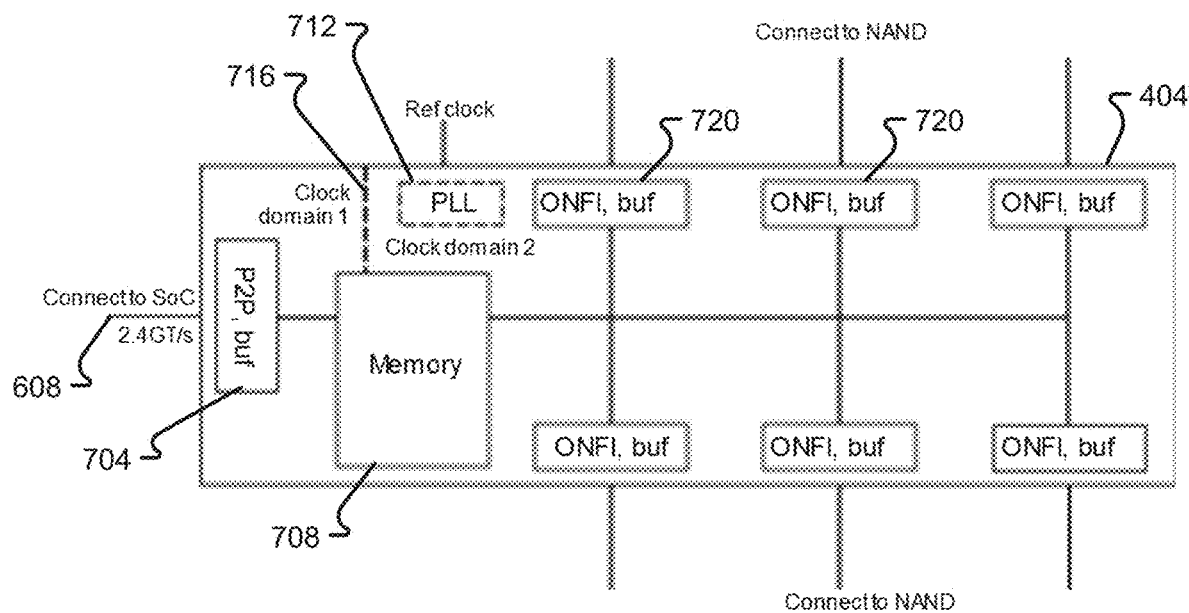
FIG. 7 is a block diagram depicting details of an expander and/or re-timer in accordance with at least some embodiments of the present disclosure.

With reference now to FIG. 7, additional details of an expander/re-timer 404 will be described in accordance with at least some embodiments of the present disclosure. The expander/re-timer 404 is shown to include a controller interface buffer 704, internal buffer memory 708, an internal clock 712, and a plurality of computer memory device buffers 720. As shown in FIG. 7, the internal buffer memory 708 provides an interface between a first clock domain (e.g., a clock domain of the higher throughput connection 608 with the controller 204) and a second clock domain (e.g., a clock domain of the computer memory devices 232). In some embodiments, the various clock domains (e.g., the high-throughput clock from the controller/first clock domain and the ONFI v4.1 clock/second clock domain) may vary. As an example, the ONFI v4.1 clock and data rate may depend upon the reference clock from the controller that is received at the internal clock 712. The internal clock 712 may adjust the reference clock signal of the controller 204 depending upon the desired operating speed of the second clock domain. The internal buffer memory 708 is accessible from both clock domains in accordance with at least some embodiments of the present disclosure.

The controller interface buffer 704 may serve to initially receive I/O commands and data associated therewith from the controller 204. The I/O commands and data associated therewith may be moved from the controller interface buffer 704 to the internal buffer memory 708 for storage and distribution among the various buffers 720, for eventual delivery to a computer memory device 232. In some embodiments, the data transfer speed at the higher throughput connection 608 may be approximately 2.4 GT/s. Data is received at the controller interface buffer 704 at this speed and then transferred to the internal buffer memory 708, where it can be stored for a predetermined amount of time sufficient to accommodate a slower data throughput speed of the connections with the various computer memory devices 232. This slowing of data may be facilitated by buffering data within the internal buffer memory 708 and then distributing the data among the plurality of computer memory devices 232 via the various memory device buffers 720. Thus, data from the memory 708 may be transferred to the buffers 720 before being written into a computer memory device 232.

When an I/O command corresponds to a read request, the data from a computer memory device 232 may first be retrieved and stored into the buffers 720. The data may then be transferred from the buffers 720 to the internal buffer memory 708 until it is placed onto the connection 608 via the controller interface buffer 704. This allows the controller 204 to retrieve data from the computer memory devices 232 in addition to providing data onto the computer memory devices 232 during execution of a write request.

Again, the difference between the first clock domain and second clock domain may be maintained with a clock boundary 716. The clock boundary 716 may be created at the internal buffer memory 708, which provides a mechanism for slowing down or speeding up the data transmission between the controller and the computer memory devices 232 connected to the expander/re-timer 404. The overall throughput of the expander/re-timer 404 can still be maintained at the high connectivity speed (e.g., 2.4 GT/s) because the data from the internal buffer memory 708 can be placed onto a plurality of different buffers 720 and a plurality of different computer memory devices 232 substantially simultaneously (e.g., in parallel). This effectively enables the expander/re-timer 404 to maintain data throughput speeds, but at a slower clock rate (e.g., according to the second clock domain). In some embodiments, the expander/re-timer 404 can talk to each of the computer memory devices 232 at a slower clock rate in addition to providing switching functions. Thus, the expander enables clock timing changes as well as data distribution functions. The expander/re-timer 404 helps handle speed differences between the controller 204 and computer memory devices 232 so data packets don't necessarily have to be synchronized.

Figure 8:
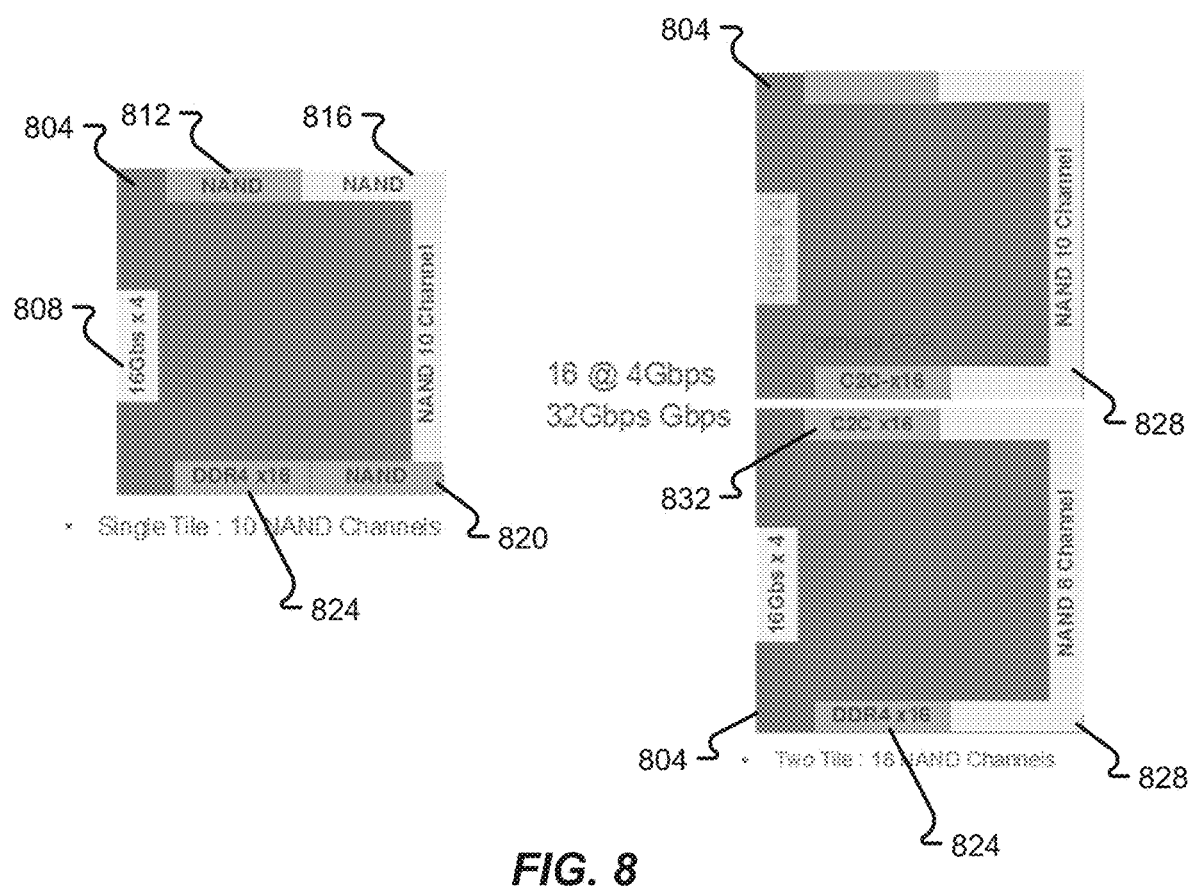
FIG. 8 is a block diagram depicting various configurations of a single controller and multiple controllers tiled together in accordance with at least some embodiments of the present disclosure.

With reference now to FIG. 8, additional capabilities of a controller 204 will be described in accordance with at least some embodiments of the present disclosure. More specifically, a controller 204 is shown in both a single SoC configuration as well as a multiple SoC configuration where two or more SoCs are tiled together and the port between the controller 204 SoCs is used as a chip-to-chip link that operates at a higher throughput. This particular configuration of a controller 204 represents another possible configuration that can be used in addition to or in lieu of the various other controller configurations (and/or storage media interface configurations) depicted and described herein.

FIG. 8 specifically shows individual tiles 804 of controllers 204 and their various I/O ports. In a single tile 804 configuration, the controller 204 has four 16 GBps ports 808, a first NAND port 812, a second NAND port 820, a DDR4 port 824, and 10 additional NAND channels 816. In the second configuration, two tiles 804 are connected with one another and the DDR port 824 is used as a chip-to-chip link 832 that operates at a higher data throughput than the DDR port 824. Similar to the other configuration options for the storage media interfaces depicted and described herein, the DDR port 824 may be reconfigured to the chip-to-chip link 832 by repositioning a switch within one or both of the controller tiles 804 to repurpose the port 824. In this second configuration, one of the tiles still has 10 NAND channels 828 and the other tile 804 has an additional 8 NAND channels 828, providing the overall system a total of 18 NAND channels. Thus, in some embodiments, the DDR interface 824 can be reconfigured as a chip-to-chip interface 832 to effectively create a DDR data bus between the tiles 804 of controller 204.

Figure 9:
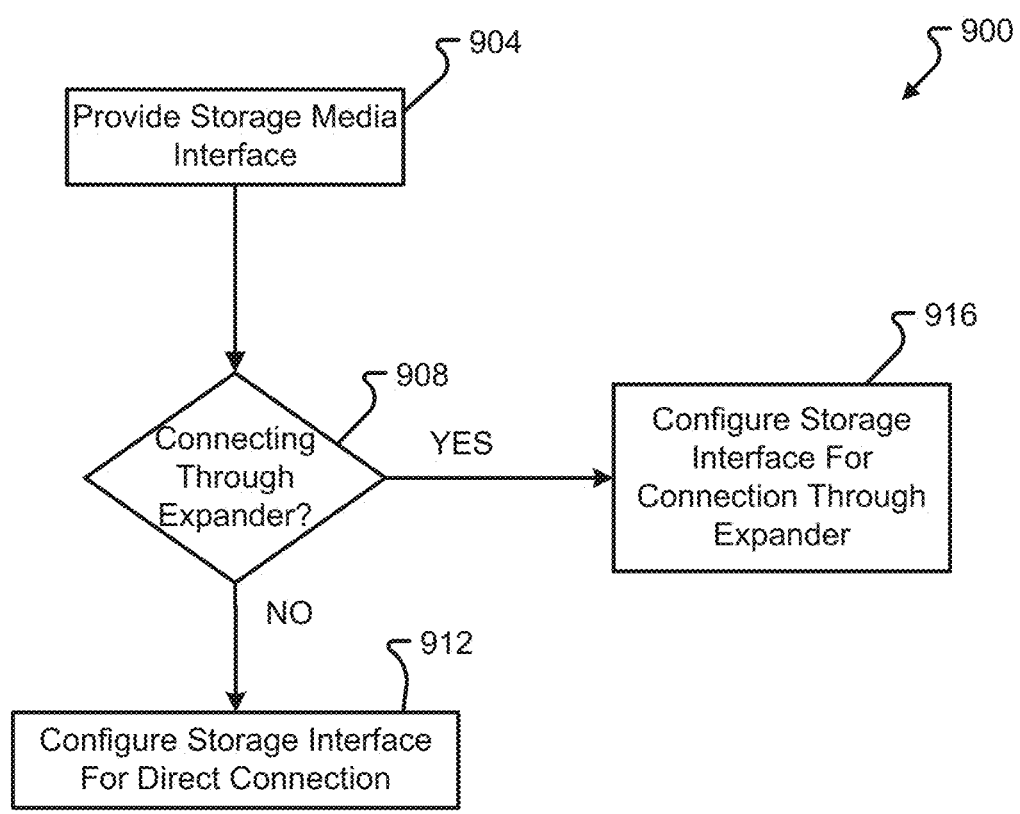
FIG. 9 is a flow diagram depicting a method of configuring a memory controller in accordance with at least some embodiments of the present disclosure.

With reference now to FIG. 9, a method 900 of configuring a controller 204 will be described in accordance with at least some embodiments of the present disclosure. The method 900 begins by providing one or multiple storage media interfaces as part of a memory controller 204 (step 904). The method 900 continues by determining whether one or a plurality of the storage media interfaces will be connecting the controller 204 with a computer memory device 232 directly or via an expander/re-timer 404 (step 908). If the decision is made to connect a storage media interface directly to a computer memory device 232, then the method continues by configuring the storage media interface for a direct connection with a computer memory device 232 (step 912). In some embodiments, this step may include positioning a switch 516 into an appropriate position to utilize a first driver that facilitates a direct connection with a computer memory device 232.

Referring back to step 908, if it is determined that a storage media interface will be connected with an expander/re-timer, then the method 900 continues by configuring the storage media interface for connection with the expander/re-timer 404 (step 916). In some embodiments, this step may include positing a switch such that an appropriate driver is used to enable connectivity with an expander/re-timer 404, which may provide a single storage media interface with the ability to connect with a plurality of storage media devices 232. It should be appreciated that one or more storage media interfaces may be configured or reconfigured as needed. Thus, the method 900 may be performed as many times as desired for one or multiple storage media interfaces of a controller 204 without departing from the scope of the present disclosure.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A semiconductor device, comprising:
 a host interface that enables bi-directional communications with a host computer;
 a processor subsystem that enables processing of read or write requests received at the host interface; and
 one or more storage media interfaces, each of the one or more storage media interfaces being convertible between a first configuration and a second configuration, wherein the first configuration of a storage media interface enables a direct connection with a computer memory device, and wherein the second configuration of the storage media interface enables a connection with one or a plurality of computer memory devices via an expander/re-timer that facilitates utilization of a second signaling mechanism that is different from a first signaling mechanism used in the first configuration,
 wherein the processor subsystem is configured to determine whether each of the one or more storage media interfaces is connected directly with the computer memory device or is connected with the one or the plurality of computer memory devices via the expander/re-timer and to configure each of the one or more storage media interfaces in the first configuration or the second configuration based on the determining.

2. The semiconductor device of claim 1, wherein the expander/re-timer comprises an internal memory buffer situated between the storage media interface and the plurality of computer memory devices.

3. The semiconductor device of claim 2, wherein the internal memory buffer provides a transition from a first clock domain to a second clock domain.

4. The semiconductor device of claim 3, wherein the first clock domain is driven by a clock of the semiconductor device and wherein the second clock domain is driven by a clock of the expander/re-timer.

5. The semiconductor device of claim 2, wherein the internal memory buffer enables the plurality of memory devices to be accessed in parallel with one another.

6. The semiconductor device of claim 5, wherein the plurality of memory devices comprise a plurality of NAND flash memory devices.

7. The semiconductor device of claim 1, wherein the first configuration of the storage media interface enables read/write access to the computer memory device at a first speed and wherein the second configuration of the storage media interface enables read/write access to the plurality of computer memory devices at a second speed that is less than the first speed.

8. The semiconductor device of claim 1, wherein the storage media interface is switchable between the first configuration and the second configuration by changing a switch from a first position to a second position.

9. The semiconductor device of claim 1, wherein a data throughput of the storage media interface in the second configuration is greater than the data throughput of the storage media interface in the first configuration.

10. The semiconductor device of claim 9, wherein a power consumption of the storage media interface is smaller in the second configuration as compared to the first configuration.

11. The semiconductor device of claim 1, wherein the host interface comprises a Peripheral Component Interconnect Express (PCIe) interface.

12. A memory system, comprising:
a host subsystem that processes Input/Output (I/O) requests received from a host device;
a media subsystem that distributes the I/O requests among a plurality of storage media interfaces, wherein the plurality of storage media interfaces are configurable between a first configuration and a second configuration, wherein the first configuration of the plurality of storage media interfaces enables a direction connection with computer memory devices, wherein the second configuration of the plurality of storage media interfaces enables a connection with the computer memory devices through an expander/re-timer, wherein the first configuration causes the media subsystem to utilize a first signaling mechanism, and wherein the second configuration causes the media subsystem to utilize a second signaling mechanism that is different from the first signaling mechanism, wherein the first configuration of the storage media interface enables first read/write accesses for the computer memory devices at a first speed, and the second configuration of the storage media interface enables second read/write accesses for the computer memory devices at a second speed that differs from the first speed, wherein the media subsystem determines, for at least one of the plurality of storage media interfaces, whether the at least one of the plurality of storage media interfaces is connected directly to at least one of the computer memory devices or is connected to the at least one of the computer memory devices through the expander/re-timer and configures the at least one of the plurality of storage media interfaces in the first or second configuration based on the determining; and
a processor subsystem that passes I/O requests between the host subsystem and media subsystem, the I/O requests comprising the first and second read/write accesses.

13. The memory system of claim 12, wherein the expander/re-timer comprises an internal memory buffer that temporarily stores data in connection with processing I/O requests between the processor subsystem and the computer memory devices.

14. The memory system of claim 13, wherein the internal memory buffer provides a transition from a first clock domain to a second clock domain.

15. The memory system of claim 13, wherein the internal memory buffer facilitate parallel access to the computer memory devices when the storage media interfaces are in the second configuration.

16. The memory system of claim 12, wherein the host subsystem, the media subsystem, and the processor subsystem are provided on a common piece of silicon.

17. The memory system of claim 12, wherein the computer memory devices comprise flash memory devices.

18. The memory system of claim 12, wherein the first configuration of the plurality of storage media interfaces enables access to the computer memory devices at a first speed, wherein the second configuration of the plurality of storage media interfaces enables access to the computer memory devices at a second speed that is greater than the first speed, and wherein an aggregated performance of the media subsystem is greater in the second configuration as compared to the first configuration.

19. A method, comprising:
providing a storage media interface on a semiconductor device, wherein the storage media interface enables a memory controller to access one or more computer memory devices, wherein and the storage media interface is convertible between a first configuration and a second configuration;
determining whether the storage media interface is connecting directly with a computer memory device or connecting with a plurality of computer memory devices through an expander/re-timer, wherein the plurality of computer memory devices is exclusive of the computer memory device; and
based on determining whether the storage media interface is connecting directly with the computer memory device or connecting with the plurality of computer memory devices through an expander/re-timer, configuring the storage media interface in either the first configuration or the second configuration, wherein the first configuration causes the storage media interface to utilize a first signaling mechanism, and wherein the second configuration causes the storage media interface to utilize a second signaling mechanism that is different from the first signaling mechanism.

20. The method of claim 19, wherein the expander comprises an internal memory buffer situated between the storage media interface and the one or more computer memory devices and wherein the internal memory buffer provides a transition from a first clock domain to a second clock domain.

* * * * *